Dec. 27, 1949   R. I. HAHN ET AL   2,492,572
TUBING SUPPORT FOR TUBING WELDERS
Filed May 15, 1948   2 Sheets-Sheet 1

INVENTORS
Res. I. Hahn, Richard W. Speers and
BY   Bernard E. Frank
Spencer Hardman & Fisher
their attorneys Dec. 27, 1949 R. I. HAHN ET AL 2,492,572
TUBING SUPPORT FOR TUBING WELDERS
Filed May 15, 1948 2 Sheets-Sheet 2

INVENTORS
Rea I. Hahn, Richard W. Spears
and Bernard E. Frout
BY
Spencer Hardman & Fehr
their attorneys Patented Dec. 27, 1949

2,492,572

UNITED STATES PATENT OFFICE 2,492,572

TUBING SUPPORT FOR TUBING WELDERS

Rea I. Hahn, Richard W. Spears, and Bernard E. Frank, Rochester, N. Y., assignors to General Motors Corporation, Detroit, Mich., a corporation of Delaware Application May 15, 1948, Serial No. 27,274

3 Claims. (Cl. 219—6)

1

This invention relates to the manufacture of tubing by forming a strip of steel into tubular formation with a butt joint and electrically welding the joints. The electric welding apparatus to which the present invention relates may, for example, be that disclosed in the Nichols Patent #2,293,846 issued August 25, 1942. This patent discloses a grooved roller for supporting the tubing as it passes between the winding electrodes, said roller being urged toward the electrodes by a weight attached to a lever which supports the roller.

An object of the invention is to provide certain improvements in the roller supporting device, one of the improvements being the use of constant fluid pressure actuated means for urging the roller toward the electrodes of the welding machine.

Further objects and advantages of the present invention will be apparent from the following description, reference being had to the accompanying drawings, wherein a preferred embodiment of the present invention is clearly shown.

Figure 4:
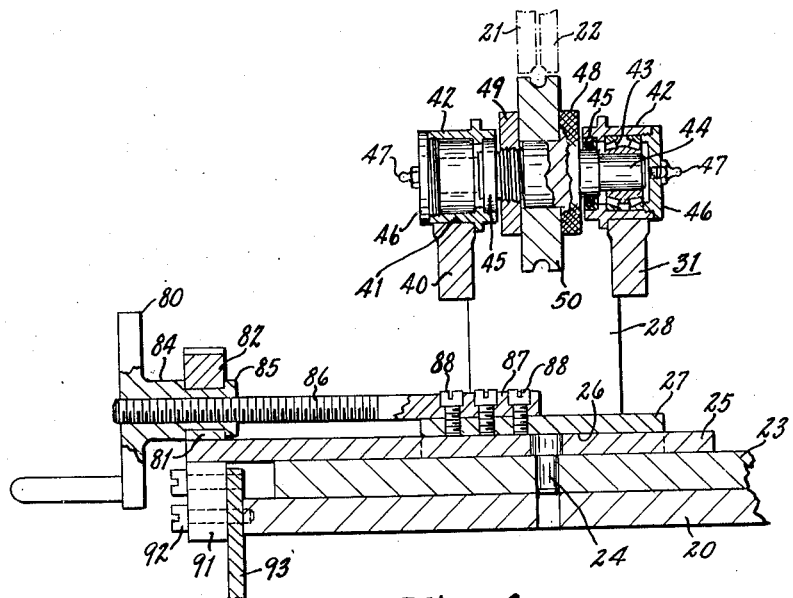
Fig. 4 is a sectional view on the line 4—4 of Fig. 3.

Referring to Fig. 4, there is a table 20 located below the welding electrodes 21 and 22 indicated by dot-dash lines. The table 20 supports a base plate 23, supporting a pivot pin 24 whose axis if extended would intersect the horizontal axis of the welding electrodes and the center of the radius of the tubing-receiving groove of the electrodes. The pin 24 is received by a hole in a plate 25 which is received by a groove 26 in a plate 27. A bracket 28 is attached to plate 27 by screws 29. Between the bifurcations 30 of bracket 28 there is located the hub of lever 31 pivotally supported by a rod 32 which is pressed into the bifurcations 30. Screws 33 attach face plates 34 of bearing metal to the hub of lever 31 and said plates are so spaced that they provide a close running fit between the bifurcations 30. Lubrication of bearing plates 34 and the rod 32 is provided by passages 35 and 36 connected with a nipple 37 to which a grease gun may be applied.

The lever 31 is integral with yoke parts 40, each having a notch or pocket 41 for receiving a cylindrical bearing case 42. Each case 42 carries a taper roller bearing 43 supporting a shaft 44 and a shaft seal ring 45 and a cap 46 carrying a grease gun nipple 47 through which lubricant is forced into the case 42. Shaft 44 supports a grooved tubing supporting wheel 50 which

2 is confined between a shoulder 48 of the shaft and a nut 49 threadedly engaging the shaft. The shoulder 48 and nut 49 are knurled so that the shoulder may be held by the hand while the other hand turns the nut 49. Each knurled part is provided with holes 51 into which the rods may be inserted for further tightening of the nut by the rod while the shoulder or flange is held by another rod.

Figure 1:
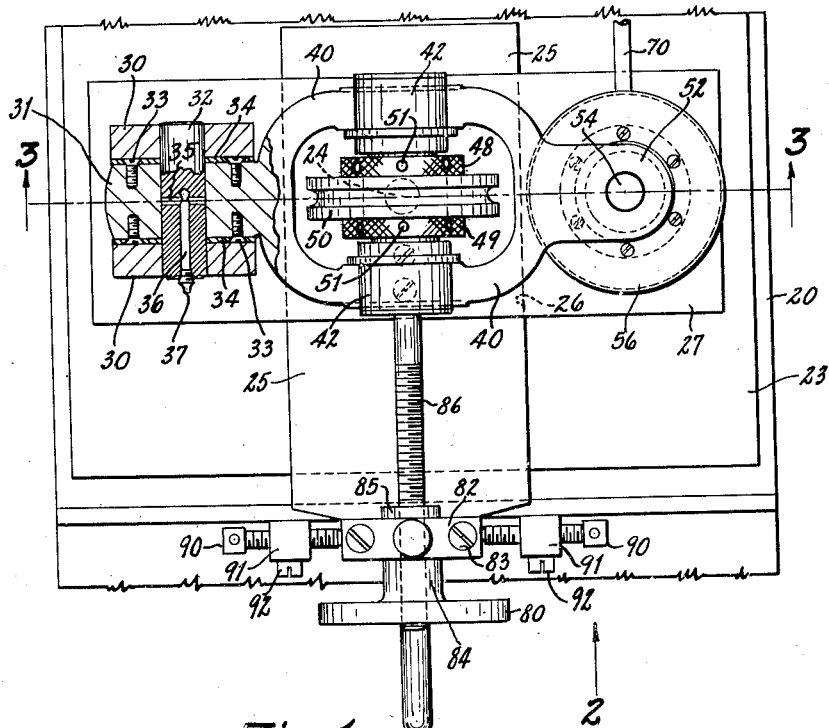
Fig. 1 is a plan view of the roller and its supporting device, the part in section being taken on the line 1—1 of Fig. 2.

The roller supporting lever 31 has a free end portion 52 which is provided with a hole 53 for receiving the shank 54 of a cup member 55 which extends into a hole provided by the top wall of a cylindrical case 56 which encloses a metal bellows 57, the upper end of which is attached to a plate 58 having a central knob 59 having a spherical surface 60 for engaging the flat surface of cup 55. Screws 58a attach a gasket 58b and the top wall of case 56 to plate 58. The lower end of bellows 57 is attached to the flange of a disc 61 which, together with a spacer disc 62, is attached by screws 63 to the plate 27. A rod 64 which is screwed into a central, tapped hole in the disc 61, has side passages 65 connecting a central passage 66 which connects with a vertical passage 67 in disc 61, said vertical passage being closed by a plug 68. The vertical passage 67 connects with a horizontal passage 69 which is connected with a flexible pipe 70 (Fig. 1) which is connected with a compressed air pump through a regulating valve whereby the pressure maintained within the bellows 57 is substantially constant. Before the disc 61 is assembled with the disc 62 and the plate 27, a ring 71 is placed around the lower portion of disc 61; and, after the parts 54, 55 and 56 are assembled with the bellows 57, the ring 71 is attached to the case 56 by screws 72. The shoulder 73 of disc 61 serves as a stop to limit upward movement of the ring 71 so that the roller will not engage the electrodes when there is no tubing between the roller and electrodes. Since the central boss 59 has a spherical surface 60, point contact is provided between the plate 58 and the cup 55. Consequently, as the lever 31 moves owing to variation in the tubing diameter there is no appreciable change in pressure in which the roller 50 exerts against the tubing by virtue of the air pressure within the bellows. When air pressure is relieved, the bellows collapses until the plate 58 strikes the pin 64.

Figure 2:
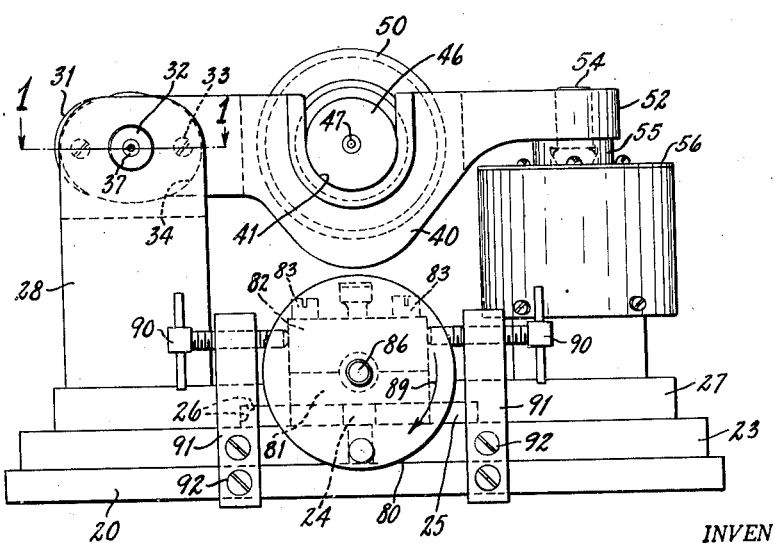
Fig. 2 is a view in the direction of arrow 2 of Fig. 1.
Figure 3:
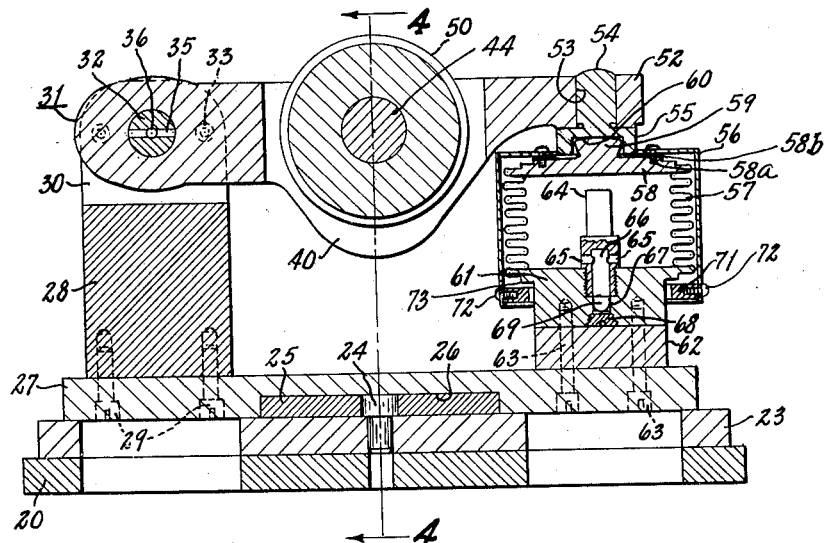
Fig. 3 is a view taken on the line 3—3 of Fig. 1.

The plate 27 may be adjusted horizontally in a direction parallel to the axis of rotation of the electrodes by turning a crank disc 80, which is rotatably supported between bearing blocks 81 and 82 which screws 83 attach to the plate 25. These blocks fit between shoulders 84 and 85 provided by the hub of the wheel 80. Therefore the wheel cannot move axially. The hub of wheel 80 provides a nut threadedly engaging a nonrotatable screw 86 which is integral with a plate 87 which screws 88 attach to the plate 27. By turning the wheel 80 clockwise as viewed in the direction of arrow 89 (Fig. 2) the screw 86 will move left in Fig. 4 in order to move the wheel 50 away from the plane of the welding electrodes so that the wheel may be removed and replaced by another having a different groove radius. The welding electrodes replaced by others having the same groove radius so that the entire apparatus can be adapted to weld tubing of different diameters. The entire assembly of roller 50 and its bearing retainers 42 can be removed simply by lifting it up from the yokes 40. When the proper wheel 50 is in position, the disc 80 is turned counterclockwise to cause the screw to move to the right in Fig. 4 in order that the seam of the tubing (which is uppermost as the tubing passes from the tubing forming rolls) will be aligned with the air gap between the two electrode discs 21 and 22 (Fig. 4).

Plate 25 and parts supported thereby including the wheel 50 can be rotated about the axis of pin 24 by a manipulation of the adjusting screws 90 which are threaded through bars 91 which screws 92 attach to a table supporting plate 93. These screws 90 engage the bearing block 82 and are so adjusted that the groove of wheel 50 will be aligned with the groove provided by the welding electrodes. Consequently, the tubing will pass between the electrodes and the supporting wheel without being distorted during the welding operation.

The use of the compact, fluid-pressure actuated device for urging the roller 50 against the tubing as it passes between the roller and the electrodes facilitates the construction of a compact sub-assembly which comprises plate 27, bracket 28, lever 31, roller 50 and said device. This sub-assembly is such that it can easily be moved by turning the disc 80 from functioning position to a position where the roller and its bearing can readily be removed from the lever 31 for replacement of the roller by another having a different groove radius.

While the embodiment of the present invention as herein disclosed, constitutes a preferred form, it is to be understood that other forms might be adopted, all coming within the scope of the claims which follow.

What is claimed is as follows:

1. A tubing support for use with an electrical welder having spaced rotary electrodes together providing an annular groove for receiving the tubing, said support comprising a roller providing a tubing-receiving groove similar to the groove provided by the electrodes, a lever supporting the roller, a bracket providing a pivotal support for the lever and a device which supports the lever and which includes a metal bellows, a fixed support to which one end of the bellows is attached, a pressure fluid duct through the fixed support into the bellows and connectible with a source of constant fluid pressure, a movable plate attached to the other end of the bellows and having a central knob provided with a spherical surface, an inverted cup-shaped member attached to the lever and providing a plane surface engaging said spherical surface and providing a flange surrounding the knob, and a bellows case comprising a cylindrical part surrounding the bellows attached to the movable plate, and a stop member attached to the cylindrical part and engaged with an abutment provided by the fixed bellows support to limit expansion of the bellows.

2. A tubing support for use with an electrical welder having spaced rotary electrodes together providing an annular groove for receiving the tubing, said support comprising a roller providing a tube-receiving groove similar to the groove provided by the electrodes, a lever supporting the roller, a bracket providing a pivotal support for the lever and a device which supports the lever and which includes a metal bellows, a fixed support to which one end of the bellows is attached, a pressure fluid duct through the fixed support into the bellows and connectible with a source of constant fluid pressure, a member which transmits thrust exerted by the bellows to the lever to urge the roller against the tubing with substantially constant pressure, said lever having a central yoke comprising spaced branches providing aligned pockets defined by U-shaped walls, said pockets being open on the upper side of the lever, a removable assembly unit comprising the roller, a shaft supporting the roller, bearings supporting the shaft and bearing housings supporting the bearings and received by said pockets, a plate supporting the bracket, device and lever and means for moving the plate in a direction to retract the lever from the electrodes into a position for removal of said assembly unit by upward movement thereof relative to the lever.

3. A tubing support for use with an electrical welder having spaced rotary electrodes together providing an annular groove for receiving the tubing, said support comprising a roller providing a tubing-receiving groove similar to the groove provided by the electrodes, a lever supporting the roller, a bracket providing a pivotal support for the lever and a device which supports the lever and which includes a metal bellows, a fixed support to which one end of the bellows is attached, a pressure fluid duct through the fixed support into the bellows and connectible with a source of constant fluid pressure, a member which transmits thrust exerted by the bellows to the lever to urge the roller against the tubing with substantially constant pressure, a plate to which the bracket and the fixed support for the bellows are attached, a second plate which supports the first plate and provides a guide for movement of the first plate in a direction which is axially of the shaft, a third plate which supports the second plate and which provides a pivot for the second plate on a vertical axis which intersects the axis of rotation of the electrodes and the middle of the tubing-receiving groove provided thereby, means for moving the first plate to move the roller away from or into vertical alignment with the electrodes and means for angularly adjusting the second plate relative to the third.

REA I. HAHN.
RICHARD W. SPEARS.
BERNARD E. FRANK.

REFERENCES CITED

The following references are of record in the file of this patent:

UNITED STATES PATENTS

| Number | Name | Date |
|---|---|---|
| 2,205,681 | Caputo | June 25, 1940 |
| 2,208,676 | Kosman | July 23, 1940 |
| 2,293,846 | Nichols | Aug. 25, 1942 |